United States Patent [19]
Kou

[11] Patent Number: 5,402,424
[45] Date of Patent: Mar. 28, 1995

[54] SYNCHRONIZATION OF CLOCKS IN A SATELLITE COMMUNICATION NETWORK BY PREASSIGNING CONSTANTS TO STATIONS OF THE NETWORK

[75] Inventor: Yukari Kou, Tokyo, Japan

[73] Assignee: NEC Corporation, Tokyo, Japan

[21] Appl. No.: 145,331

[22] Filed: Oct. 29, 1993

[30] Foreign Application Priority Data

Oct. 30, 1992 [JP] Japan ................................. 4-293376

[51] Int. Cl.6 ........................... H04J 3/06; H04L 7/08
[52] U.S. Cl. ................................ 370/95.3; 370/104.1; 455/13.2
[58] Field of Search .................... 370/94.1, 95.3, 100.1, 370/103, 104.1, 108; 455/13.2; 375/107

[56] References Cited

U.S. PATENT DOCUMENTS

| | | | |
|---|---|---|---|
| 4,607,257 | 8/1986 | Noguchi | 370/104.1 X |
| 4,688,216 | 8/1987 | Saburi | 370/104.1 |
| 4,689,787 | 8/1987 | Hotta | 370/104.1 |
| 4,800,560 | 1/1989 | Aoki et al. | 370/104.1 |
| 4,947,451 | 8/1990 | Nawata | 370/104.1 X |

*Primary Examiner*—Melvin Marcelo
*Attorney, Agent, or Firm*—Ostrolenk, Faber, Gerb & Soffen

[57] ABSTRACT

In a satellite communication network, a reference station simultaneously announces a reference time of a reference clock once in a predetermined duration of time to all terrestrial stations of the network. In each terrestrial station which comprises a local clock, a packet forming arrangement, a data extracting arrangement for extracting a local time datum from a packet received from a different terrestrial station, and a calculation unit for calculating a propagation delay time between the different terrestrial station and the terrestrial station under consideration by subtracting from the local time datum a current time indicated by the local clock when the local time datum is extracted, a time setting arrangement sets the current time at a sum of the local time datum and a constant preassigned to the terrestrial station in question. The constant is preliminarily decided by calculating a distance on the earth between the terrestrial station and the reference station based on their longitudes and latitudes, calculating a physical length of a communication link by using the distance, and calculating a time necessary for electromagnetic waves to travel the physical length.

9 Claims, 4 Drawing Sheets

FIG. 1

Prior Art

SYNCHRONIZATION OF CLOCKS IN A SATELLITE COMMUNICATION NETWORK BY PREASSIGNING CONSTANTS TO STATIONS OF THE NETWORK

BACKGROUND OF THE INVENTION

This invention relates to a satellite communication method and network and, more particularly, to synchronization of clocks used in terrestrial or earth stations of the network for use in measuring a propagation delay time between any two of the terrestrial stations.

As a method of measuring a propagation delay time between two terrestrial stations, it is a most basic method to determined the propagation delay time by making each station transmit data to a satellite of the network and receive the data therefrom, calculating a one-way propagation delay between it and the satellite, and calculating a sum of the one-way propagation delays calculated for the two stations between which communication should be carried out.

In order to measure the propagation delay time in connection with each datum, it is necessary to make all terrestrial stations have a common clock. Each of the terrestrial stations comprises a local clock indicative of a current time which advances periodically. A reference station of the network comprises a reference clock indicative of a reference time. In order to make the local clocks of the terrestrial stations synchronously indicate a common time, it is known to make the reference station simultaneously announce the reference time to the terrestrial stations through a communication link established by the reference station to the terrestrial stations through a satellite of the network. In each terrestrial station, its current time is set with reference to the reference time received through the communication link.

The reference station may be a center station which is operable also as one of the terrestrial stations. Including the center station, each terrestrial station can establish a bidirectional link to and from at least one selected station of the terrestrial stations and transmit a transmission signal to the selected station or receive a reception signal from the selected station through the bidirectional link. It is known to use a packet in each of the transmission and the reception signals.

In a manner which will later be described, each terrestrial station of a conventional satellite communication network comprises a local clock indicative of the current time. A packet forming arrangement forms the transmission packet to which a local time datum is attached to indicate the current time of production of the transmission packet. A data extracting arrangement extracts a particular time datum from the reception packet received from the selected station. A calculation unit calculates the propagation delay time. A first station of the terrestrial stations transmits a first packet as the transmission packet. Similarly, a second station of the terrestrial stations transmits a second packet as the transmission packet to a particular link established by the second station as the bidirectional link to and from the first station. The second packet carries the particular time datum, which indicates the current time in the second station when the second packet is formed. The first station receives the second packet as the reception packet.

By the basic method of determining the propagation delay time from the one-way propagation delays at two stations, it is impossible to measure fluctuations in the propagation delays between data due to a variation in traffic, performance of a link access system, and a processing time in each terrestrial station.

It is possible in the manner described above to real-time calculate a propagation delay time per datum by using a conventional time synchronization method to time synchronize all terrestrial stations, by making each station use a current time thereof when transmitting data, and by calculating a difference from a current time of a receiving station. This, however, gives rise to a problem such that it is impossible to correctly measure the propagation delay time due to an error introduced thereinto by a geographic difference between the terrestrial stations as will be described later.

SUMMARY OF THE INVENTION

In view of the foregoing, it is an object of the present invention to provide an improved satellite communication method and an improved satellite communication network capable of correctly measuring a propagation delay time between two terrestrial stations through a satellite used in the method and in the network.

It is another object of this invention to provide a method and a network by which it is possible to correctly synchronize clocks used in the method or in the network.

This invention is applicable to either evaluation or analysis of a communication capability of the satellite communication system in which two terrestrial stations transmit and receive data through a satellite communication link.

Other objects of this invention will become clear as the description proceeds.

The method of the present invention is for use for a satellite communication network in synchronizing clocks, each clock installed as a local clock in each station of a plurality of terrestrial stations of the satellite communication network to indicate a current time periodically. The satellite communication network comprises a reference station comprising a reference clock indicative of a reference time periodically. The method of the present invention comprises the steps of: (A) forming in the reference station a common packet once in a predetermined duration of time with the common packet made to indicate the reference time as a common time datum when the common packet is formed; (B) simultaneously announcing the common packet to the terrestrial stations through a satellite of the satellite communication network; (C) extracting in the above-mentioned each station the common time datum as an extracted time datum from the common packet received through the satellite and; (D) setting the current time at a time instant indicated by a sum of the extracted time datum and a constant preassigned to each station, where the constant has a value decided by calculating a distance on the earth between each station and the reference station based on their longitudes and latitudes, calculating a physical length of a communication link for simultaneous announcement of the common packet by using the distance, and calculating a time necessary for electromagnetic waves to travel the physical length of the communication link.

Satellite The communication network comprises a plurality of terrestrial stations. Each station establishes a bidirectional link to and from at least one selected station of the terrestrial stations through a satellite and comprises a local clock indicative of a current time periodically, packet forming means for forming a transmission packet for transmission to the bidirectional link with the transmission packet made to additionally represent as a local time datum the current time indicated when supplied with data to be represented by the transmission packet, data extracting means for extracting a particular time datum from a reception packet received through the bidirectional link from the selected station, and a calculation unit connected to the local clock and to the data extracting means for calculating a propagation delay between each station and the selected station through the bidirectional link. In the network of the present invention, a first station of the plurality of terrestrial stations is used as each terrestrial station to transmit a first packet as the transmission packet to the bidirectional link established thereby and a second station of the plurality of terrestrial stations, as the selected station to transmit a second packet as the transmission packet to a particular link established thereby as the terrestrial link by using the first station as the selected station relative to the second station with the second packet made to indicate the current time thereof as the particular time datum when the packet forming means thereof is supplied with data to be represented by the second packet. Under the circumstances, the first station receives the second packet as the reception packet through the particular link.

According to an aspect of this invention in which the above-understood satellite communication network comprises a reference station for establishing a unidirectional link to the terrestrial stations through the satellite, the reference station comprises a reference clock indicative of a reference time periodically and announcing means for forming a common packet for transmission to the unidirectional link once in a predetermined duration of time to simultaneously announce the common packet to the terrestrial stations through the unidirectional link with the common packet made to indicate the reference time as a common time datum when the common packet is formed. In this event, each station further comprises time setting means for extracting the common time datum as an extracted time datum from the common packet received through the unidirectional link and for setting the current time at a time instant indicated by a sum of the extracted time datum and a constant preassigned to this each station.

According to another aspect of this invention in which one of the terrestrial stations of the aboveunderstood satellite communication network is used as a center station for establishing a common link as the bidirectional link with each of the terrestrial stations used as the selected station, the center station comprises a reference clock indicative of a reference time periodically and announcing means for forming a common packet for transmission to the common link once in a predetermined duration of time to simultaneously announce the common packet to the terrestrial stations through the common link with the common packet made to indicate the reference time as a common time datum when the common packet is formed. In this case, each station further comprises time setting means for extracting the common time datum as an extracted time datum from the common packet received through the common link and for setting the current time at a time instant indicated by a sum of the extracted time datum and a constant preassigned to this each station.

BRIEF DESCRIPTION OF THE DRAWING

FIG. 6, drawn below FIG. 4, is a schematic diagram of a satellite communication network according to a second embodiment of this invention.

DESCRIPTION OF THE PREFERRED EMBODIMENTS

Figure 1:
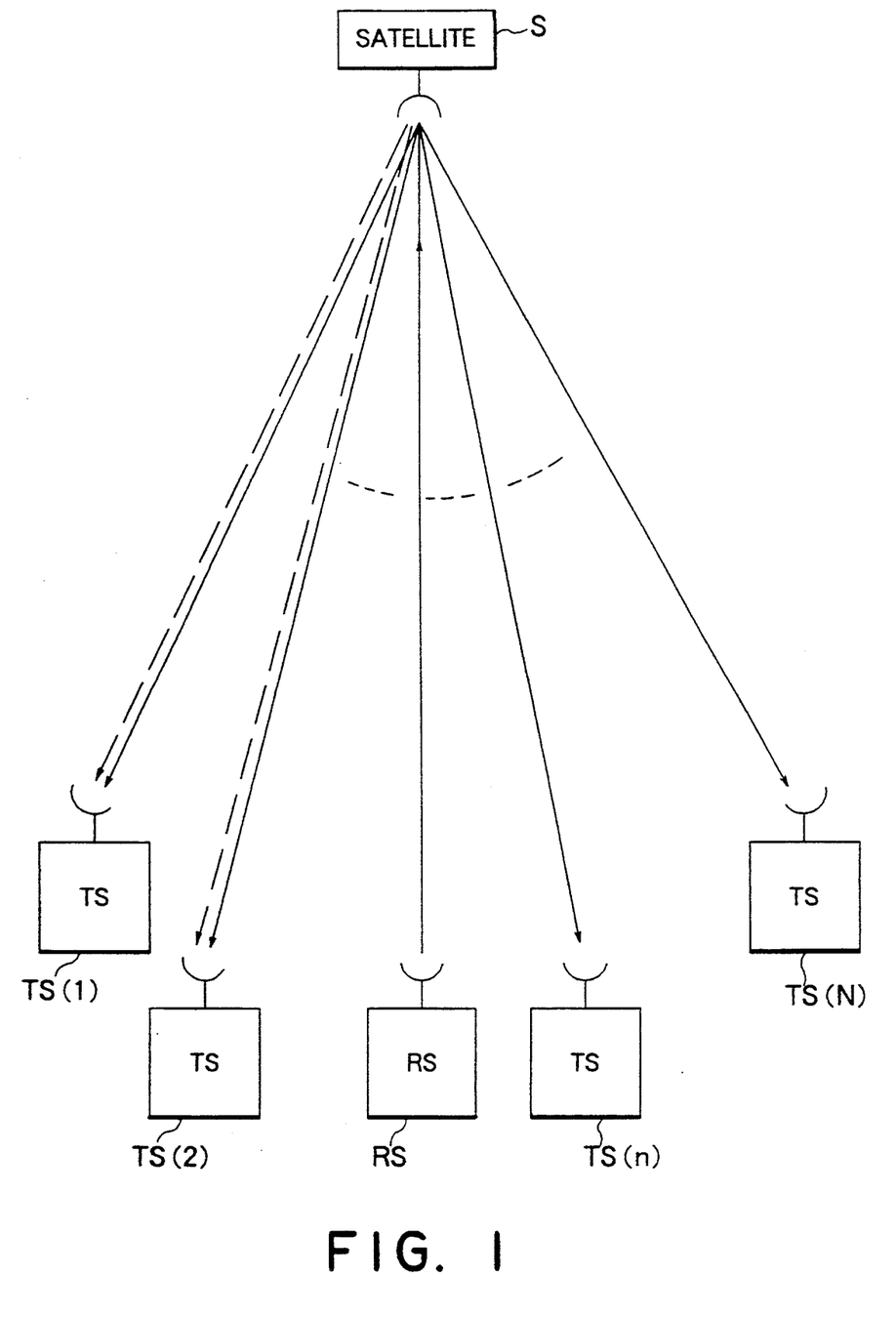
FIG. 1 schematically shows a satellite communication network according to a first embodiment of the instant invention.

Referring to FIG. 1, a satellite communication network according to a first embodiment of the present invention includes a plurality of terrestrial or earth stations (TS). These terrestrial stations will be called first, second, ..., n-th, ..., and N-th terrestrial stations TS(1), TS(2), ..., TS(n), ..., and TS(N), where N represents a positive integer which depends on the scale of the network. The terrestrial stations will be collectively designated by a reference symbol TS. Each station of the plurality of terrestrial stations TS will be referred to as the n-th terrestrial station TS(n) and will be denoted by a reference symbol TS(n), where n is variable between 1 and N, both inclusive. Two of the terrestrial stations TS will be arbitrarily selected and called first and second stations. It is possible to understand without loss of generality that the first and the second stations are the first and the second terrestrial stations TS(1) and TS(2) and will be so labelled.

Each station TS(n) establishes a bidirectional link through a satellite S of the satellite communication network to and from at least one selected station of the terrestrial stations TS. The operation of the selected station or stations will become clear as the description proceeds.

The satellite communication network comprises a reference station (RS) in addition to the terrestrial stations TS. The reference station will be designated by a reference symbol RS and establishes a unidirectional link to each of the terrestrial stations TS through the satellite S. For convenience of the description which follows, each bidirectional link is illustrated by a dashed line with arrowheads. Each unidirectional link is depicted by a solid line with arrowheads.

Figure 2:
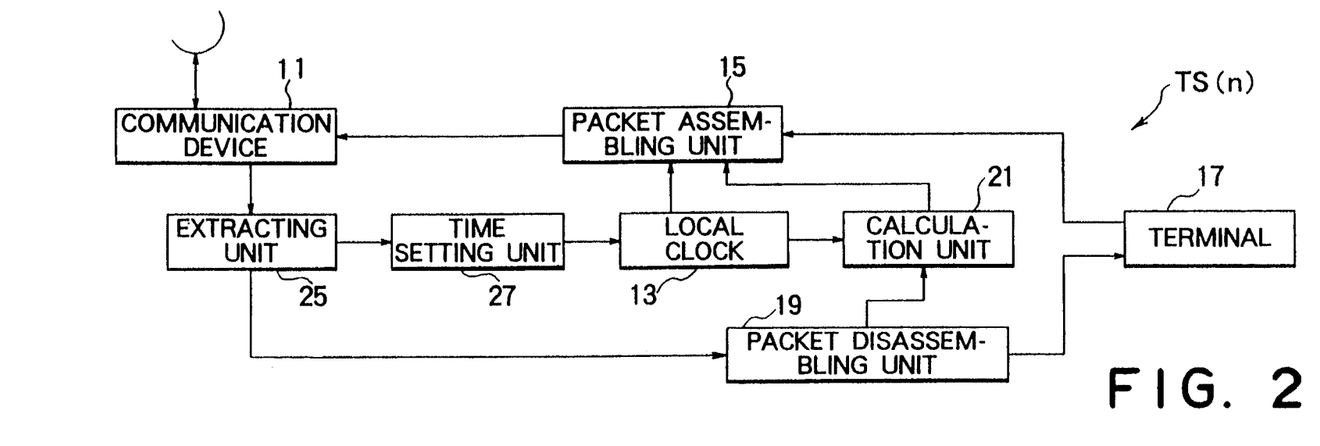
FIG. 2 is a block diagram of a terrestrial station for use in the satellite communication network depicted in FIG. 1.

Referring to FIG. 2 with FIG. 1 continuously referred to, each station TS(n) comprises a communication device 11 connected to an antenna for transmitting and receiving signals through the bidirectional link and receives a signal transmitted from the reference station RS by controlling access to the bidirectional and the unidirectional links. The station TS(n) comprises a local clock 13 which is often called a real time clock in the art and indicates a current or local time. The current time advances periodically.

A packet assembling unit 15 is supplied with data from a terrestrial station terminal 17 and forms a sequence of packets representative of the data. The packet assembling unit 15 is also supplied with the current time from the local clock 13 and attaches a local time datum representative of the current time to a header of each packet. Such a packet is herein called a transmission packet and sent to the communication device 11 for transmission to the bidirectional link. In the transmission packet, the local time datum represents the current time at which the transmission packet is formed in the packet assembly unit 17, namely, the time at which the data are produced and delivered in and from the terrestrial station terminal 17.

Receiving a radio signal either through the bidirectional or the unidirectional link, the communication device 11 produces a baseband signal which comprises reception packets. It will be presumed that the illustrated station TS(n) is the second station TS(2) and that such a reception packet is received through the bidirectional link from the first station TS(1). In this event, the reception packet is delivered to a packet disassembling unit 19 for extracting the local time datum of the first station TS(1) as an extracted time datum from the received packet and for supplying the terrestrial station terminal 17 with a remaining part of the reception packet. The remaining part represents the data transmitted from the first station TS(1). In the reception packet, the local time datum represents the first-station current time at which data are produced in the terrestrial station terminal of the first station TS(1).

Supplied from the local clock 13 with the current time and from the packet disassembling unit 19 with the extracted time datum, a calculator unit 21 calculates a difference between the local time and the extracted time datum as a propagation delay time of a signal transmitted from the first station TS(1) to the second station TS(2) through the bidirectional link. The local time in this case represents a time instant at which the extracted time datum is supplied to the calculation unit 21. For calculation in the calculation unit 21, it is assumed that the local clock 13 always delivers the current time to the calculation unit 21. A signal representative of the propagation delay time is delivered to the packet assembling unit 15 in order to adjust access control in the bidirectional link towards a particularly selected station.

It is now understood that a combination of the packet assembling unit 15 and the communication device 11 serves as the packet forming arrangement mentioned hereinabove. Another combination of the packet disassembling unit 19 and the communication device 11 serves as the data extracting arrangement mentioned heretobefore.

Figure 3:
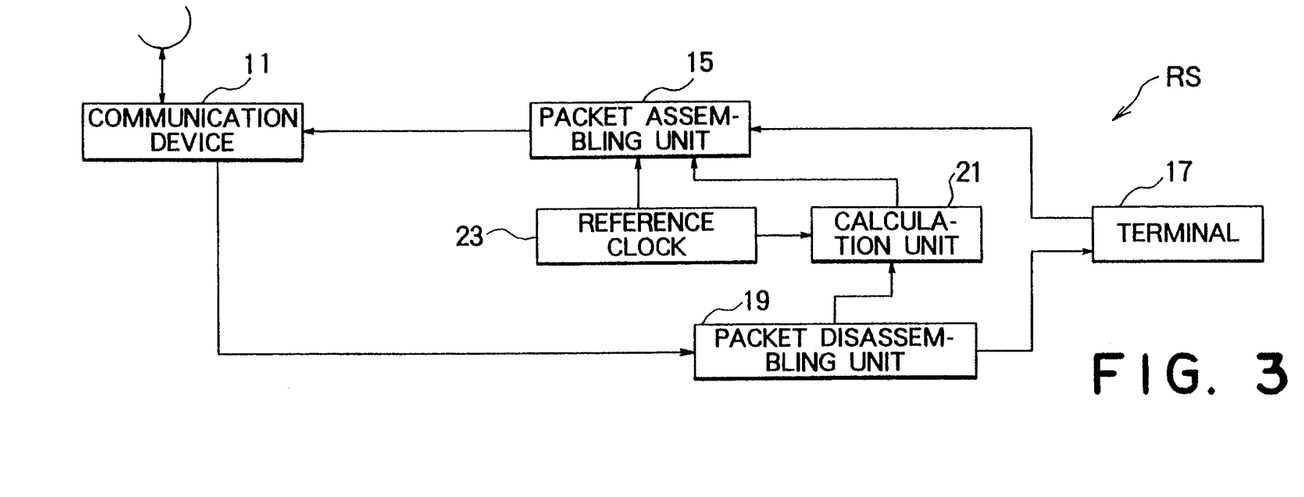
FIG. 3 is a block diagram of a reference station for use in the satellite communication network illustrated in FIG. 1.

Referring to FIG. 3 with FIGS. 1 and 2 additionally referred to, the reference station RS comprises a communication device which is not substantially different from the communication device 11 of each station TS(n) and is denoted by the reference numeral 11. Similarly, the packet assembling unit is designated by the reference numeral 15. In the reference station, a reference clock 23 supplies the packet assembling unit 15 with a reference time which advances periodically.

Supplied with the reference time from the reference clock 23, the packet assembling unit 15 attaches a reference or common time datum to a header of a packet formed therein. This packet will be called a common packet for the reason which will shortly become clear. The reference time datum represents the reference time at which the common packet is formed. The common packet may mainly represent data supplied to the packet assembling unit 15 from a reference station terminal which is equivalent to the terrestrial station terminal and is indicated by the reference numeral 17.

In the manner described in the foregoing, the reference station RS establishes unidirectional links to the terrestrial stations TS, respectively. The unidirectional links are herein referred to collectively as the unidirectional link. Delivered to the communication device 11, the common packet is transmitted through the unidirectional link to the terrestrial stations TS in common. It should be noted that the common packet is formed once in a predetermined duration of time which is determined mainly in view of the traffic in the satellite communication network and may be empirically decided between five to ten minutes. As for the reference station RS, a combination of the packet assembling unit 15 and the communication device 11 serves as an announcing arrangement described hereinabove.

Figure 4:
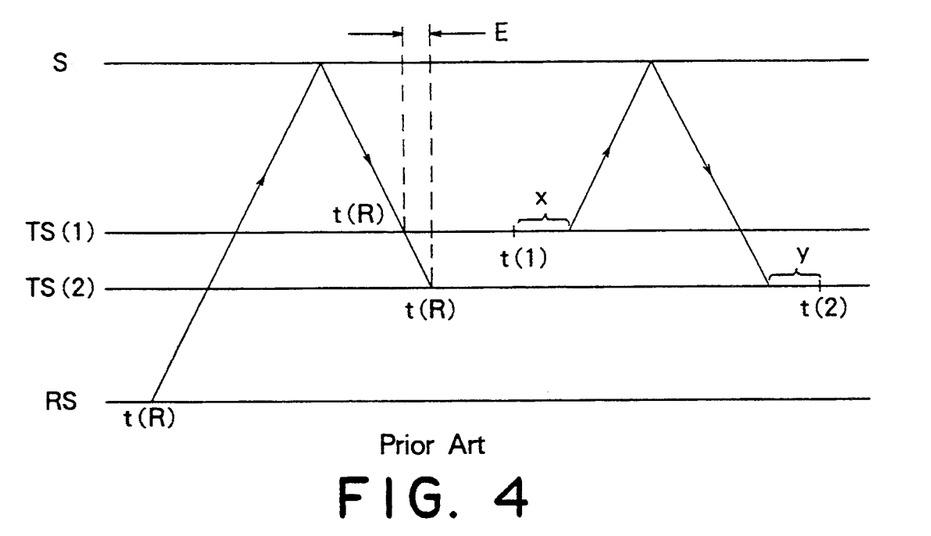
FIG. 4 is a time chart for use in describing operation of a conventional satellite communication network.

Turning temporarily to FIG. 4 with reference to FIGS. 1 through 3, the first, the second, and the reference stations are indicated at TS(1), TS(2), and RS. The satellite is indicated at S with a distance thereto depicted very short.

It is presumed that the common packet is transmitted from the reference station RS at a time instant t(R) indicated at the reference station RS. More particularly, the time instant t(R) represents the reference time datum represented by the common packet. The common packet is received through the unidirectional link at the first and the second stations TS(1) and TS(2) as indicated by the reference signal t(R) at these stations TS(1) and TS(2). It may be possible to use the common packet in synchronizing the local clocks 13 of the first and the second stations TS(1) and TS(2) with the reference clock 23. The common packet is, however, received at the first and the second stations TS(1) and TS(2) with a difference or an error E in time synchronization dependent on the geographic difference mentioned heretobefore relative to the satellite S. As a consequence, the propagation delay time is erroneously decided if measured based on such local clocks 13.

In FIG. 4, propagation of the transmission packet of the first station TS(1) is additionally illustrated. In the terrestrial station terminal 17 of the first station TS(1), the data are produced in its terrestrial station terminal 17 and are assembled by its packet assembling unit 15 into the transmission packet at a time instant t(1). Including the local time datum of the first station TS(1), the transmission packet is transmitted from the first station TS(1) a first processing time x later than the time instant t(1). Through the bidirectional link, the transmitted packet is received as the reception packet by the second station TS(2) as exemplified by thick line segments having a vertex at the satellite S. A second processing time y later than reception of the reception packet, the data of the reception packet is delivered from the packet disassembling unit 19 of the second station TS(2) to the terrestrial station terminal 17.

Turning back to FIGS. 2 and 3 with FIG. 1 additionally referred to, each terrestrial station TS(n) comprises an extracting unit 25 supplied from the communication device 11 with the baseband signal comprising the reception packet. The extracting unit 25 extracts the reference time datum as an extracted time datum from the reception packet received through the unidirectional link. Responsive to the extracted time datum, a time setting unit 27 sets the local time at a time instant which is equal to a sum of the reference time indicated by the extracted time datum, namely, by the common packet, and an n-th constant D(n) specific to the n-th terrestrial station.

A combination of the extracting unit 25 and the time setting unit 27 serves as a time setting arrangement. In the example being illustrated, the time setting arrangement and the packet disassembling unit 19 are connected in series to the communication device 11 with the time extracting unit 25 interposed between the communication device 11 and the packet disassembling unit 15.

After the reference time datum, if any, is extracted from the reception packet, a remaining portion is delivered to the packet disassembling unit 19, which disassembles the remaining portion into the data for supply to the terrestrial station terminal 17. In this event, the remaining portion comprises no local time datum. If the reception packet includes the local time datum, the reception packet includes no reference time datum. The time setting arrangement produces the reception packet as it stands. It is readily possible to discriminate between the local and the reference time data. For example, they may be given different bit patterns. Alternatively, they may be positioned at different time slots.

As an alternative to the series connection of the extracting unit and the packet disassembling unit 19, it is possible to connect them in parallel to the communication device 11. As described before, the packet disassembling unit 19 supplies its output to the terrestrial station terminal 17 and to the calculation unit 21. The extracting unit 25 is connected to the time setting unit 27. Under the circumstances, the extracting unit 25 and the packet disassembling unit 15 individually respond to the reference and the local time data. It is possible to control by the local clock 13 either the communication device 11 or the extracting and the packet disassembling units 25 and 19 with reference to the predetermined duration of time.

As a further alternative, it is possible to interpose the extracting unit 25 between the packet disassembling unit 19 and the calculation unit 21. In such an event, the packet disassembling unit 19 should separate the local and the reference time data from the reception and the common packets.

After all, a constant, such as the n-th constant D(n) is preliminarily calculated to be either stored in the time setting unit 27 or supplied as a signal representative of the constant to the time setting unit 27. In the process of calculation of the constant described heretobefore, the physical length of the bidirectional or the unidirectional link is readily calculated either by using a height of the satellite S above the earth (earth's surface) and its longitude or by using one-way propagation delays measured individually at the two terrestrial stations, one of which may be the reference station RS. Although depicted in FIG. 3, the packet disassembling unit 19 and the calculation unit 21 are unnecessary in the reference station RS.

Referring to FIG. 5 and again to FIGS. 1 through 3, the first, the second, and the reference stations TS(1), TS(2), and RS are indicated like in FIG. 4. The one-way propagation delays of the first and the second stations TS(1) and TS(2) are represented by F(1) and F(2). It is possible to synchronize the local clocks 13 of the first and the second stations TS(1) and TS(2) by setting their current times at (t(R)+F(1)) and (t(R)+F(2)) in the manner indicated.

Figure 5:
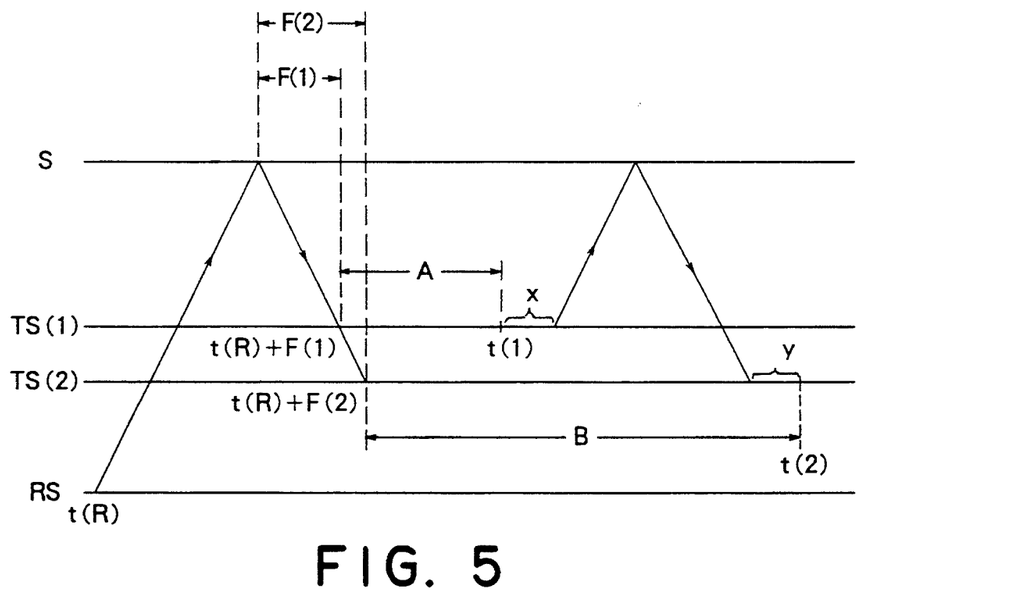
FIG. 5 shows a time chart for use in describing operation of the satellite communication network which comprises the terrestrial and the reference stations depicted in FIGS. 2 and 3.

Subsequently, the first station TS(1) transmits the first packet as the transmission packet towards the second station TS(2). When transmitting the transmission packet, the first station TS(1) attaches to the first packet, as a first time instant t(1), its current time at which the data are produced at its terrestrial station terminal 17. Receiving the first packet as the reception packet, the second station TS(2) reads from its local clock 13, as a second time instant t(2), its current time of delivery of the data to its terrestrial station terminal 17.

A time interval of elapse in the first station TS(1) between reception of the common packet from the reference station RS and production of the data at its terminal 17 will be represented by A. The first time instant t(1) is given by:

$$t(1)=t(R)+F(1)+A. \quad (1)$$

Similarly, B will be used to represent a time interval of elapse in the second station TS(2) from reception of the common packet from the reference station RS to delivery of the data to its terminal 17. The second time instant t(2) is given by:

$$t(2)=t(R)+F(2)+B. \quad (2)$$

From Equations 1 and 2, a propagation delay time between the first and the second stations TS(1) and TS(2) is given by:

$$t(2)-t(1)=B-A+F(2)-F(1). \quad (3)$$

This propagation delay time is calculated by the calculation unit 21 of the second station TS(2) and used in adjusting the access control. The propagation delay time includes the first and the second processing times x and y.

Figure 6:
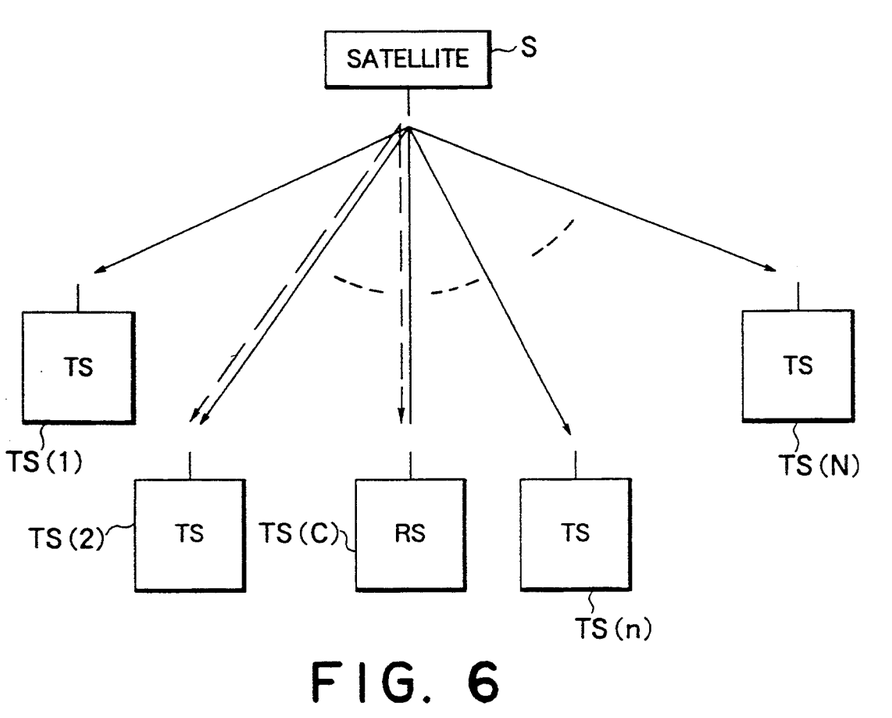

Referring now to FIG. 6, the description will proceed to a satellite communication network according to a second embodiment of this invention. FIG. 2 will additionally be referred to. Similar parts are designated by like reference symbols. The description in the foregoing is applicable unless otherwise specifically mentioned.

In FIG. 6, one of the terrestrial stations TS is used as a center or common station TS(C) of the type described hereinabove. In other words, the satellite communication network is a star-type communication network. The center station TS(C) is operable as each station TS(n) of the terrestrial stations TS and as the reference station RS described in conjunction with FIG. 1.

The center station TS(C) simultaneously announces a common packet to other or peripheral terrestrial stations TS(1) to TS(N) once in the predetermined duration of time. In the meanwhile, the center station TS(C) receives packets transmitted thereto through the bidirectional link from one of the peripheral terrestrial stations TS(1) to TS(N). The bidirectional link is referred to in this event collectively as a common link.

Being one of the terrestrial stations TS, the center station TS(C) is structured in the same manner illustrated with reference to FIG. 2 showing the structure of each station TS(n). In the center station TS(C), the local clock 13 serves as the reference clock 23 described in connection with FIG. 3 to indicate the reference time advancing periodically, as from a time instant at which the center station TS(C) is put into operation. The common packet comprises a common time datum indicated by the reference time when each common packet is formed in the packet assembling unit 15.

Referring to FIG. 7 and again to FIGS. 2 and 6, the first and the center stations are indicated at TS(1) and TS(C). The center station TS(C) transmits the common packet towards the first station TS(1). Indicated by the center station TS(C) rather than by the reference station RS, the common time datum is denoted by t(C). In other words, the common packet is transmitted from the center station TS(C) to the common link when the reference clock 23 indicates the reference time t(C).

The one-way propagation delay of the first station TS(1) is again represented by F(1) relative to the satellite S. A like one-way propagation delay of the center station TS(C) is designated by F(C). It is possible to set the current time of the first station TS(1) at (t(C)+F(1)). The reference time could be set at (t(C)+F(C)) as labelled in FIG. 7 in the parentheses. The reference clock 23 indicates (t(C)+2F(C)) labelled at a point where thick dashed line reaches the center station TS(C).

Figure 7:
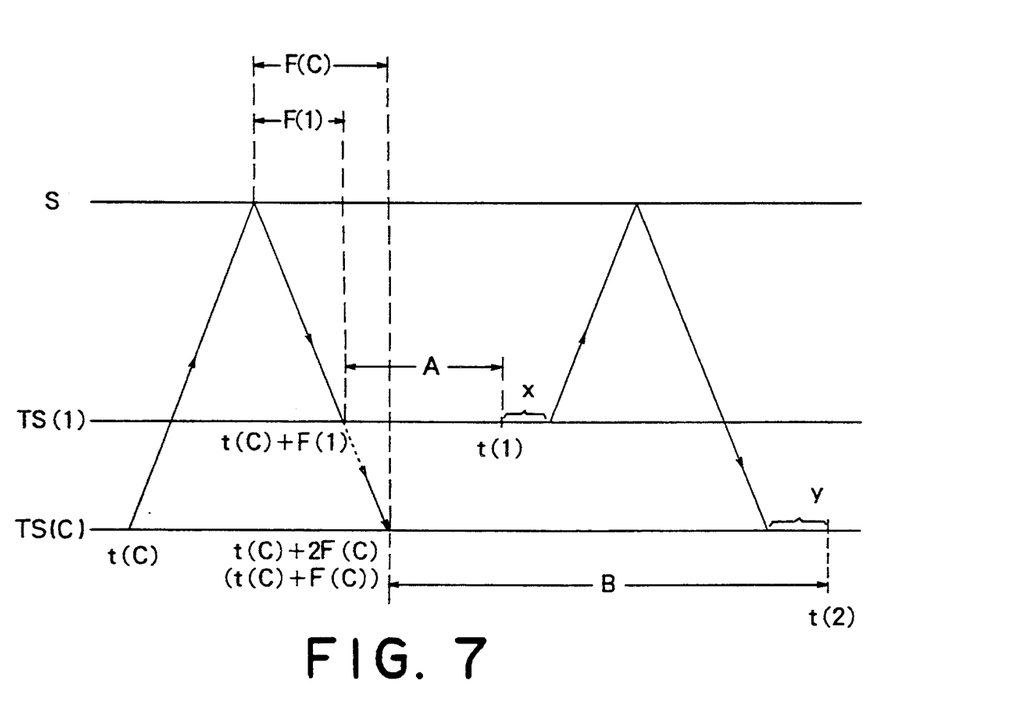
FIG. 7 shows a time chart for use in describing operation of the satellite communication network illustrated in FIG. 6.

In consideration of the foregoing, the propagation delay time is calculated in connection with packets transmitted between the first station TS(1) and the center station TS(C). The first station TS(1) attaches to the first packet the local time datum indicated, as a first time instant t(1), by the current time when the data are produced at its terrestrial station terminal 17 and delivered to its packet assembling unit 15. Receiving the first packet representative of the data and the local time datum representative of the first time instant t(1), the center station TS(C) uses the reference time of a second time instant t(2) at which the data are delivered to its center or terrestrial station terminal 17. In the calculation unit 21 of the center station TS(C), its one-way propagation delay F(C) is subtracted from the second time instant t(2) to provide a correction, which is subtracted in turn from the first time instant t(1) of the first packet separated by the packet disassembling unit 19 and delivered to the calculation unit 21.

In FIG. 7, the letter A is again used to represent a time interval between reception of the common packet at the first station TS(1) and production of the data for the first packet in the terminal 17 of the first station TS(1). The first time instant t(1) is given by:

$$t(1) = t(C) + F(1) + A. \quad (4)$$

Likewise, B represents another time interval between reception of the common packet at the center station TS(C) and delivery of the data of the first packet to the center station terminal 17. The second time instant t(2) is given by:

$$t(2) = t(C) + 2F(C) + B. \quad (5)$$

From Equations 4 and 5, the propagation delay time between the center station TS(C) and the first station TS(1) is given by:

$$(t(2) - F(C)) - t(1) = B - A + F(C) - F(1). \quad (6)$$

It is now appreciated that Equation 6 is not different from Equation 3.

In each station TS(n), the extracting unit 25 and the time setting unit 27 are used as before. This makes it possible to precisely synchronize the local clocks 13 of the peripheral stations TS(1) to TS(N) with the reference clock 23 of the center station TS(C) and to correctly measure the propagation delay time between any two of the center and the peripheral stations TS.

It is possible to accumulate the propagation delay time in the calculation unit 21 of one of the terrestrial stations TS, typically of the center station TS(C). Calculating either an average propagation delay time or fluctuations in the propagation delay time during a desired time interval, it is possible to evaluate or analyze a performance of the satellite communication network.

What is claimed is:

1. A method for synchronizing clocks in a satellite communication network, each of the clocks being installed as a local clock in each of a plurality of terrestrial stations of said satellite communication network to periodically indicate a current time, said satellite communication network comprising a reference station having a reference clock for periodically indicating a reference time, said method comprising the steps of:

forming in said reference station a common packet once in a predetermined duration of time with said common packet made to indicate the reference time as a common time datum when said common packet is formed;

simultaneously announcing said common packet to said terrestrial stations through a satellite of said satellite communication network;

extracting in each of said terrestrial stations said common time datum as an extracted time datum from the common packet received through said satellite; and setting said current time at a time instant indicated by a sum of said extracted time datum and a constant preassigned to each of said terrestrial stations;

said constant having a value determined by calculating a time necessary for electromagnetic waves to travel a physical length of a communication link between each of said terrestrial stations and said satellite.

2. A satellite communication network including a plurality of terrestrial stations, each of said plurality of terrestrial stations establishing a bidirectional link to and from at least one selected terrestrial station of said plurality of terrestrial stations through a satellite, each of said plurality of terrestrial stations including:

a local clock for periodically indicating a current time;

packet forming means for forming a transmission packet for transmission to said bidirectional link with said transmission packet made to additionally represent as a local time datum the current time indicated when supplied with data to be represented by said transmission packet;

data extracting means for extracting a particular time datum from a reception packet received through said bidirectional link from said selected station; and a calculation unit connected to said local clock and to said data extracting means for calculating a propagation delay between each of said terrestrial stations and said selected station through said bidirectional link, a first station of said plurality of terrestrial stations being used as said each station to transmit a first packet as said transmission packet to the bidirectional link established thereby, a second station of said terrestrial stations being used as said selected station to transmit a second packet as said transmission packet to a particular link established thereby as said bidirectional link by using said first station as said selected station relative to said second station with said second packet made to indicate the current time thereof as said particular time datum when the packet forming means thereof is supplied with data to be represented by said second packet, said first station receiving said second packet as said reception packet through said particular link, said satellite communication network comprising a reference station for establishing a unidirectional link to each of said terrestrial stations through said satellite, wherein:

said reference station comprises a reference clock for periodically indicating a reference time and announcing means for forming a common packet for transmission to said unidirectional link once in a predetermined duration of time to simultaneously announce said common packet to said terrestrial stations through said unidirectional link with said common packet made to indicate the reference time as a common time datum when said common packet is formed;

said each station further comprising time setting means for extracting said common time datum as an extracted time datum from the common packet received through said unidirectional link and for setting said current time at a time instant indicated by a sum of said extracted time datum and a constant preassigned to said each station.

3. A satellite communication network as claimed in claim 2, wherein said time setting means comprises:

time extracting means for extracting said extracted time datum from the common packet received through said unidirectional link; and a time setting unit for setting said current time at said time instant.

4. A satellite communication network as claimed in claim 3, wherein said constant is given a value determined by calculating a time necessary for electromagnetic waves to travel a physical length of said unidirectional link from said reference station to each of said terrestrial stations.

5. A satellite communication network as claimed in claim 3, said each station comprising a communication device for receiving said reception packet from said bidirectional link and said common packet from said unidirectional link, wherein said time extracting means is interposed between said communication device and said data extracting means.

6. A satellite communication network comprising a plurality of terrestrial stations, each of said terrestrial stations establishing a bidirectional link to and from at least one selected station of said terrestrial stations through a satellite and including:

a local clock for periodically indicating a current time;

packet forming means for forming a transmission packet for transmission to said bidirectional link with said transmission packet made to additionally represent as a local time datum the current time indicated when supplied with data to be represented by said transmission packet;

data extracting means for extracting a particular time datum from a reception packet received through said bidirectional link from said selected station; and a calculation unit connected to said local clock and to said data extracting means for calculating a propagation delay between said each station and said selected station through said bidirectional link, a first station of said terrestrial stations being used as said each station to transmit a first packet as said transmission packet to the bidirectional link established thereby, a second station of said terrestrial stations being used as said selected station to transmit a second packet as said transmission packet to a particular link established thereby as said bidirectional link by using said first station as said selected station relative to said second station with said second packet made to indicate the current time thereof as said particular time datum when the packet forming means thereof is supplied with data to be represented by said second packet, said first station receiving said second packet as said reception packet through said particular link, one of said terrestrial stations being used as a center station for establishing a common link as said bidirectional link with each of said terrestrial stations used as said selected station, wherein:

said center station comprises a reference clock periodically indicating a reference time and announcing means for forming a common packet for transmission to said common link once a predetermined duration of time to simultaneously announce said common packet to said terrestrial stations through said common link with said common packet made to indicate said reference time as a common time datum when said common packet is formed;

said each station further comprising time setting means for extracting said common time datum as an extracted time datum from the common packet received through said common link and for setting said current time at a time instant indicated by a sum of said extracted time datum and a constant preassigned to said each station.

7. A satellite communication network as claimed in claim 6, wherein said time setting means comprises:

time extracting means for extracting said extracted time datum from the common packet received through said common link; and a time setting unit for setting said current time at said time instant.

8. A satellite communication network as claimed in claim 7, wherein said constant is given a value determined by calculating a time necessary for electromagnetic waves to travel a physical length of said common link between each of said terrestrial stations and said common station.

9. A satellite communication network as claimed in claim 7, said each station comprising a communication device for receiving said reception packet from said bidirectional link and said common packet from said common link, wherein said time extracting means is interposed between said communication device and said data extracting means.

* * * * *